United States Patent [19]

Kallup et al.

[11] Patent Number: 4,774,993

[45] Date of Patent: Oct. 4, 1988

[54] DEVICE FOR ATTACHING TERMINAL STRAPS AND TERMINAL POLES TO THE LUGS OF A PLATE GROUP FOR A STORAGE BATTERY CELL

[75] Inventors: Bernhard Kallup, Bad Homburg; Wolfgang Glittenberg, Hattingen; Christian Kubis, Iserlohn; Gerolf Richter, Hagen; Christian Ressel, Oberursel, all of Fed. Rep. of Germany

[73] Assignee: Varta Batterie Aktiengesellschaft, Hanover, Fed. Rep. of Germany

[21] Appl. No.: 52,449

[22] Filed: May 19, 1987

[30] Foreign Application Priority Data

Jun. 21, 1986 [DE] Fed. Rep. of Germany ....... 3620891

[51] Int. Cl.$^4$ .......................... B22C 9/06; B22D 19/04
[52] U.S. Cl. ..................................... 164/323; 164/322; 164/333; 164/334; 164/348; 164/DIG. 1; 164/109
[58] Field of Search ........... 164/98, 109, 108, DIG. 1, 164/129, 348, 322, 323, 333, 334

[56] References Cited

U.S. PATENT DOCUMENTS 3,912,544  10/1975  Sabatino ................... 164/DIG. 1 X
4,086,695   5/1978  Cornette et al. ......... 164/DIG. 1 X Primary Examiner—Kuang Y. Lin
Attorney, Agent, or Firm—Weiser & Stapler

[57] ABSTRACT

A device, configured as a double mold, for casting terminal bars (straps) and terminal poles onto the lugs of a completely assembled plate group for electric storage batteries ensures optimum attachment of all of the lugs (both polarities) to the molten bar lead if the heat exchange between the bar lead and the dipped volume of each negative or positive lug is identical. This requirement is met by causing the negative and positive casting molds, together with their contents, to form thermally equivalent sections or blocks, which are equalized if necessary, by changing the dimensions (thickness) of the mold's walls. When the lugs are made of lead or a lead alloy, such a double mold also makes it possible, during a subsequent two-stage cooling process, to first allow the terminal poles to solidify, simultaneously, and to then allow the terminal bars to solidify, simultaneously. If the negative plates of the cell group have copper grids and lugs (which may also be coated with lead or lead-tin alloys), the two-stage cooling process must be effected at different working rates for the two polarities.

11 Claims, 1 Drawing Sheet

DEVICE FOR ATTACHING TERMINAL STRAPS AND TERMINAL POLES TO THE LUGS OF A PLATE GROUP FOR A STORAGE BATTERY CELL

BACKGROUND OF THE INVENTION

The present invention relates generally to a device for attaching terminal straps and terminal poles to the lugs of a plate group, by casting the straps and poles onto the lugs of a completely assembled plate group for a storage battery cell.

Originally, the lugs for all of the negative and all of the positive electrodes of a storage battery cell were individually (or collectively) soldered to the terminal straps (or bars) of the corresponding polarity. However, today, in the interests of economy, the so-called cast-on-strap (COS) process has become generally accepted for this purpose. In this process, both of the terminal bars and the terminal poles (or intercell connectors) are simultaneously attached to a prefabricated plate group, complete with separators, as follows. The assembled plate group is first retained upside down in a retaining cartridge or holder. The lugs which extend from the plate group are then dipped into casting molds (one for each polarity) filled with molten lead, so that the lugs are first melted, and thereafter solidified with the contents of the mold to form the cast-on strap (bar) portions. After solidification the molten lead later becomes the terminal bar and the terminal pole, which are solidly joined to the plate lugs. To this end, the lead is caused to solidify, by gradually dipping the molds into a still or flowing cooling medium.

Because of the spatial separation between the positive and negative lugs of the plate group, the casting molds combine to form a double mold which, in its working position, can be raised and lowered with respect to the plate group. Conversely, the casting molds can remain stationary, while the lugs are dipped into the molten lead by lowering the plate group into the casting molds.

Practical experience with the COS proces has shown that the casting molds, which contain molten metal corresponding not only to the positive or negative terminal straps but also to the positive or negative terminal poles, are in many cases not optimally suited to the heating requirements of the plate lugs. Non-homogeneous heat exchanges between the lead bars and the dipped lugs may, for example, be expected if the size of the bars is identical, but the number of plate lugs to be received by the positive terminal bar is not equal to the number of plate lugs to be received by the negative terminal bar.

It has already been proposed, in German Patent Application No. P 34 34 941.3, to subject the lugs which are placed at a disadvantage in terms of heat exchange with the melt to delayed cooling with respect to the other lugs, so that their deficiency in terms of heat exchange may be compensated by longer residence in the molten lead.

GB-PS No. 872,938 describes a device for casting terminal bars onto the lugs of a completed plate group using the COS principle, wherein the different numbers of lugs for the two plate polarities and their differing demands for lead are taken into account using two mold cavities of different size in a solid mold block. However, differential cooling of the mold cavities is not possible with this device, which excludes the possibility of presolidification of the terminals before the terminal bars solidify.

SUMMARY OF THE INVENTION

It is therefore the principal object of the present invention to provide a casting device of the general type described above, which guarantees identical melting and cooling conditions for all plate lugs.

This and other objects are achieved according to the present invention by providing separate casting molds for the terminals of opposing polarity having walls, the thickness of which are dimensioned so that each mold cavity is separable into thermally equivalent blocks or sections, each of which has one plate lug and the bar lead corresponding to this plate lug, and so that the quantity of heat associated with each plate lug (which is comprised of the heat capacity and volume of the bar lead for each lug as well as the heat capacity and volume of the mold wall portions associated with each plate lug) is essentially identical.

For further detail regarding the COS technique according to the present invention, reference is made to the following detailed description, taken in connection with the following illustrations.

DETAILED DESCRIPTION OF THE PREFERRED EMBODIMENT

Figure 1A:
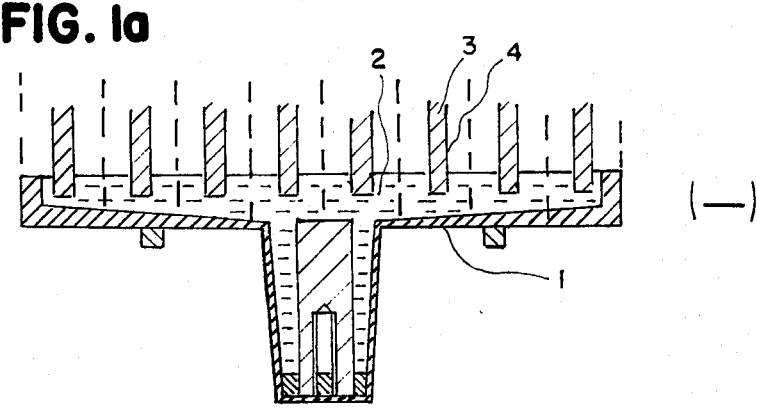
FIGS. 1a show cross-sectional views of COS casting molds which respectively contain the terminal poles, terminal bars and plate lugs of opposing polarity.
Figure 1B:
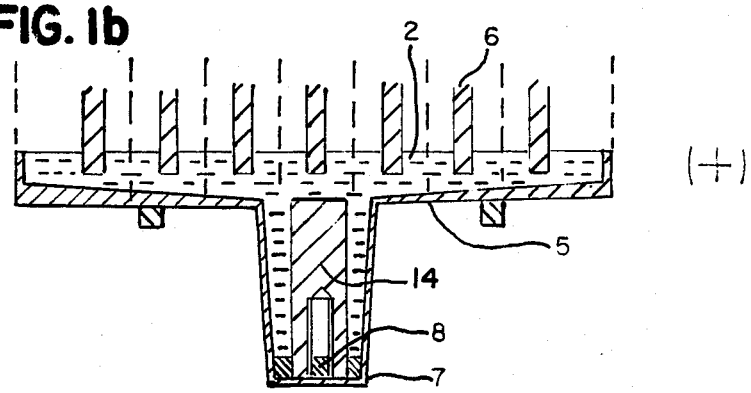
Figure 2:
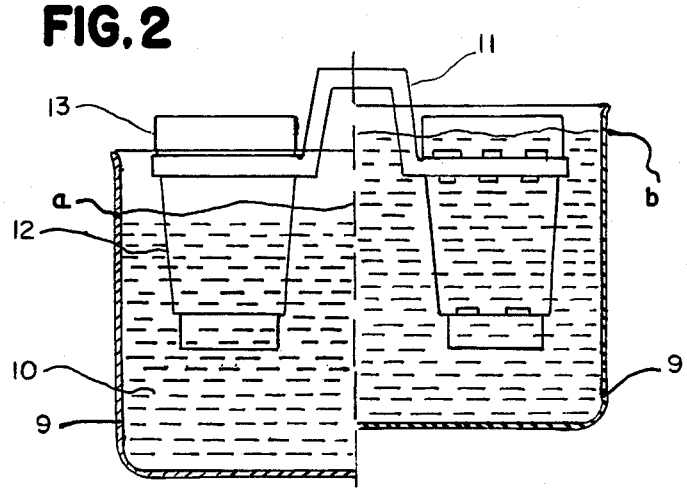
FIG. 2 shows the casting molds of FIGS. 1a and 1b in their respective cooling positions.

Referring to FIG. 1, FIG. 1a shows that the number of plate lugs 3 associated with the lead bar 2 in the negative casting mold 1 is greater by one than the number of plate lugs 6 associated with the lead bar 2 in the positive casting mold 5 of FIG. 1b. As shown in FIG. 2, both casting molds 1, 5 are placed at the same height within a double mold 11. The distance between the casting molds 1, 5 is adjusted to the terminal (lug) spacing of the cell group.

Considering first the negative casting mold 1, with its contents and by itself, heating (heat input) occurs at the lug surface portions which are dipped into the melt, and heat dissipation occurs at the cross-sectional area of the lug (as represented by the outline 4). These thermal conditions are balanced when the quantity of heat incident on each lug, which is in each case determined by the volume and the heat capacity of the lead surrounding the lug and by the surrounding section of the mold wall, is essentially of the same magnitude. To improve the mechanical stability of the mold, this state is achieved for the outer lugs by reducing the volume of lead allotted to the outer lugs and accordingly increasing the thickness of the surrounding mold walls.

Conceptually, the total system of lugs, bar lead and casting mold for the negative polarity can be divided into eight sections of identical length (dotted lines) associated with each of the eight lugs which are provided, which possess identical quantities of heat. This graphical representation emphasizes the fact that the total system can be considered as being made up of a number of thermally equivalent blocks.

Since casting on of the bar lead in the negative mold 1 occurs simultaneously with casting on of the bar lead in the positive mold 5, and since both molds will subsequently be subjected to a common two-stage cooling process, it becomes necessary for the uniformity in heat exchange at the negative lugs 3 to extend to the positive lugs 6 as well. However, the number of positive lugs 6 is different from the number of negative lugs 3. In accordance with the present invention, proper attachment of all of the lugs 3, 6 to the bar lead 2 associated with each casting mold 1, 5 is accomplished by subjecting each positive lug 6 to the same heat exchange conditions as each of the negative lugs 3, so that the partial sections (dotted lines) of the positive casting mold 5 are essentially equivalent in terms of their budgeted heat to the partial sections of the negative casting mold 1. In other words, the halves (positive and negative molds) of the casting mold must be dimensioned in such a way, and their wall thicknesses must be such, that in combination with the bar lead which they contain and with the lug portions dipped therein, the mold halves can be conceptually represented by a system of thermally equivalent blocks surrounding each of the lugs 3, 6.

In practice, this requirement can be met, for example, by reducing the wall thickness of the casting mold corresponding to the smaller number of lugs (the positive casting mold), either only at the end surfaces (as shown at the left half of FIG. 1b) or the several surfaces (as shown at the right half of FIG. 1b). Otherwise, in comparison, the heat content of the sections (blocks) for the outer lugs would be too high. Also as a consequence of such measures, negative and positive terminal bars of approximately equal length will result. If, conversely, the positive casting mold 5 is configured based on the model of the negative casting mold 1 of FIG. 1a, the result according to the present invention will be a shorter positive lead bar, considering the smaller number of lugs.

Especially favorable conditions for configuring the casting mold in accordance with this invention are present if the plate lugs of both polarities are made of lead, or of the same lead alloy, and if the surface area which is dipping into the melt, the heat-dissipating cross sectional area, and the volume dipped into the melt for each positive and negative plate lug are essentially identical. However, even if dissimilar plate lugs are used, for example, if the negative lugs are made of copper (which may also be coated with lead or lead-tin alloys), the casting mold with its contents must absolutely correspond, in terms of its budgeted heat, to a grouping of thermally uniform sections (blocks).

The casting molds 1, 5 which are used to cast the terminal bars onto the completed plate group are often specifically set up to additionally accommodate a terminal insert 14. For this purpose, both the negative and the positive casting molds include a bowl-like extension 7 of the portion of the casting mold which is to form the terminal pole, and a retainer cone 8 for receiving the insert.

Further in accordance with the present invention, a two-stage cooling process is provided during casting on of the straps. In this process, the melt within the portions of the casting molds which correspond to the terminals, and then the portions of the melt which form the lead bars, are in each case (for each casting mold 1, 5) allowed to solidify simultaneously. As shown in FIG. 2, this process is accomplished using at least one cooling vessel 9 which contains a cooling medium (e.g., cooling water 10) which flows in and out of the vessel in a controlled manner, and which is capable of being moved from below the casting molds 1, 5 (which are retained on a connector carrier 11).

The vessel 9 is first caused to halt at a first position (as shown in the left part of FIG. 2) at which the terminal pole outlines 12 are preferably immersed to a point in the cooling medium which corresponds to the level a, such that the terminal bar outlines 13 are not yet wet. As the terminal poles solidify, the still liquid bar lead in the two casting molds acts not only as a heat reservoir, but also as a material reservoir. This is important since a contraction in volume occurs as the terminal poles solidify. The available reservoir of lead reduces the associated risk of shrinkage cavitation by the presence of additional molten material, which can flow into the terminal mold to fill up any vacuoles (vacancies) which may begin to form.

In a second cooling phase (as shown in the right part of FIG. 2), the coolant level is raised to the level b so that the coolant wets at least the entire back of the terminal bar outlines 13 within the casting mold. This brings the entire casting on process to an end, with the solidification of the remaining melt.

FIG. 2 illustrates vessel positions corresponding to the coolant levels a and b. A cooling vessel 9 for providing these levels can take the form of a single container, either with or without a dividing wall, or two containers which are moved in unison.

In the event that the negative plates of the group include an electrode grid and plate lug made of copper (which may also be coated with lead or lead-tin alloys), the layout of the terminal bars according to the previously described block system would still apply. With this arrangement, cooling can still occur according to the two-stage principle described above, i.e., first quenching the terminal pole, and then allowing the terminal bar to solidify. However, in this case, the differences in the manufacturing processes applied to the positive lugs as compared to the negative ones (made of copper or coated copper) means that the heat of the molten lead must be applied for a longer time to the positive lugs, i.e., the positive lugs must remain in the lead for a longer time to ensure that the lead melts properly and homogeneously together with the lug surfaces. This requirement can be taken into account by beginning the second cooling phase, not simultaneously for the two polarities, but rather earlier for the negative half of the plate group. The lead for the terminal pole and bar for each polarity therefore undergoes the same cooling steps as before, but because the materials forming the lugs in the two plate group halves are different, the timing of the cooling is different. In such cases, the cooling arrangement according to the present invention requires the use of two (separated) cooling vessels and must be designed so that the casting mold for the one polarity can be moved, for purposes of cooling its molten contents, independently of the one for the other polarity.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A device for attaching lead terminal bars and terminal poles by casting onto the lugs of a completely assembled plate group for a storage battery cell in a casting mold which is configured as a double mold to separately accommodate negative and positive lugs of said plate group, and making use of a two-stage cooling arrangement, the improvement wherein:

each casting mold of said double mold has walls the thickness of which are dimensioned so as to define thermally equivalent sections, each of which includes one plate lug an the bar lead surrounding said plate lug, and so that the quantity of heat associated with each of the positive and negative plate lugs, which includes the heat capacity and volume of the bar lead surrounding each lug as well as the heat capacity and volume of the mold wall portions associated with each plate lug, is essentially identical.

2. The device of claim 1 wherein the plate lugs for each polarity are comprised of lead or a lead alloy, and wherein the surface portions of said lugs which are dipped into the melt, the heat-dissipating cross sectional area of said lugs and the volume of the lug dipping into the melt are essentially identical for each of said positive and negative plate lugs.

3. The device of claim 2 which further comprises cooling means which can be moved simultaneously with respect to the casting molds of said double mold so that in a first stage, the lead forming the terminal pole is cooled, and in a second stage, the lead forming the terminal bar is cooled.

4. The device of claim 1 wherein the electrode grids and plate lugs for said plates having a positive polarity are made of lead or a lead alloy, and the electrode grids and plate lugs for said plates having a negative polarity are made of copper, lead-coated copper, or copper coated with a lead-tin alloy.

5. The device of claim 4 which further comprises cooling means which can be moved with respect to the casting molds of said double mold so that for both polarities, the lead forming the terminal poles is cooled in a first stage, and in a second stage, the lead forming the terminal bar is cooled.

6. The device of claim 5 wherein in said first stage, the lead forming one of said terminal poles is cooled for a different time duration than the lead forming the other of said terminal poles.

7. The device of claim 6 wherein the terminal pole for the plates having said positive polarity is cooled for a longer duration then the terminal pole for the plates having said negative polarity.

8. The device of claim 1 wherein said assembled plate group includes a different number of positive and negative plate lugs, while providing said thermally equivalent sections and while maintaining said essentially identical quantities of heat.

9. The device of claim 8 wherein one of said different number of plate lugs is smaller than the other of said different number of plate lugs, and wherein said mold walls are dimensioned so that the wall thickness of the casting mold for said smaller number of plate lugs is reduced.

10. The device of claim 9 wherein said mold walls of reduced thickness are located only at ends of said casting mold.

11. The device of claim 9 wherein said mold walls of reduced thickness are located along several surfaces of said casting mold.

* * * * *